(12) United States Patent
Vegh et al.

(10) Patent No.: US 10,226,794 B2
(45) Date of Patent: Mar. 12, 2019

(54) DYNAMIC TRAY SPACING

(71) Applicant: Intelligrated Headquarters, LLC, Mason, OH (US)

(72) Inventors: Mark Kenneth Vegh, Frederick, MD (US); Richmond Emory Best, Mount Airy, MD (US); Thomas Severinsen, Frederick, MD (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 44 days.

(21) Appl. No.: 15/652,323

(22) Filed: Jul. 18, 2017

(65) Prior Publication Data

US 2019/0022702 A1 Jan. 24, 2019

(51) Int. Cl.
| B07C 5/36 | (2006.01) |
| B07C 3/00 | (2006.01) |
| B07C 5/10 | (2006.01) |
| B65G 43/08 | (2006.01) |
| B65G 47/46 | (2006.01) |

(52) U.S. Cl.
CPC ............ B07C 3/006 (2013.01); B07C 5/10 (2013.01); B07C 5/361 (2013.01); B07C 5/362 (2013.01); B65G 43/08 (2013.01); *B65G 47/46* (2013.01); *B65G 2203/0216* (2013.01)

(58) Field of Classification Search
CPC ........ B65G 43/08; B65G 47/42; B65G 47/46; B65G 47/48; B65G 47/69; B65G 2811/0673; B65G 2811/0678; B07C 5/10; B07C 5/361; B07C 5/362; B07C 5/38
See application file for complete search history.

(56) References Cited

U.S. PATENT DOCUMENTS

| 3,880,298 | A | * | 4/1975 | Habegger | B65G 47/50 198/349 |
|---|---|---|---|---|---|
| 6,023,034 | A | * | 2/2000 | Nakajima | B65H 39/10 198/460.1 |
| 6,784,391 | B2 | * | 8/2004 | Takizawa | B07C 7/005 198/580 |
| 6,847,860 | B2 | * | 1/2005 | Mills | B07C 5/10 700/223 |
| 7,414,218 | B2 | * | 8/2008 | Wheeler | B07C 3/02 198/370.01 |
| 7,562,760 | B2 | * | 7/2009 | Affaticati | B07C 5/36 198/357 |
| 7,568,572 | B2 | * | 8/2009 | Zeitler | B65G 47/52 198/370.02 |
| 7,669,706 | B2 | * | 3/2010 | McLaughlin | B07C 3/02 198/347.4 |
| 7,683,285 | B2 | * | 3/2010 | Haselberger | B07C 3/082 209/584 |

(Continued)

*Primary Examiner* — Joseph C Rodriguez
(74) *Attorney, Agent, or Firm* — Alston & Bird LLP

(57) ABSTRACT

A controller of a material handling system performs a method of dynamic spacing on a sortation conveyor by predicting fullness of divert destinations. Required tray spacing between inducted articles destined for the same divert destination can be reduced when the divert destination is calculated to have sufficient capacity. Fewer discharge commands need to be ignored due to insufficient tray spacing. The material handling systems can achieve higher throughput by having fewer articles that cannot be discharged to an assigned destination.

23 Claims, 5 Drawing Sheets

(56) References Cited

U.S. PATENT DOCUMENTS

| | | | | |
|---|---|---|---|---|
| 7,687,737 B2* | 3/2010 | Zimmermann | .......... | B07C 1/04 |
| | | | | 209/583 |
| 7,923,655 B2* | 4/2011 | Quine | ....................... | B07C 3/00 |
| | | | | 209/584 |
| 7,982,156 B2* | 7/2011 | Burns | ....................... | B07C 1/02 |
| | | | | 209/584 |
| 8,100,058 B2* | 1/2012 | Austin | ................... | B65G 47/96 |
| | | | | 104/48 |
| 8,167,111 B2* | 5/2012 | Asman | ................ | B65G 47/844 |
| | | | | 198/349.95 |
| 9,073,703 B2* | 7/2015 | Fourney | ................. | B65G 47/31 |
| 9,102,336 B2* | 8/2015 | Rosenwinkel | .......... | B61B 13/04 |
| 9,604,258 B2* | 3/2017 | Layne | ........................ | B07C 5/36 |
| 9,795,995 B2* | 10/2017 | Zimmer | ................... | B07C 3/06 |
| 9,969,589 B2* | 5/2018 | Sezaki | ................... | B65H 29/58 |
| 10,106,330 B2* | 10/2018 | Maines | ................. | B65G 43/00 |
| 2006/0070929 A1 | 4/2006 | Fry | | |
| 2008/0290005 A1* | 11/2008 | Bennett | .................... | B07C 3/02 |
| | | | | 209/584 |
| 2013/0167751 A1 | 7/2013 | Rosenwinkel | | |
| 2014/0339051 A1 | 11/2014 | Fourney | | |
| 2015/0083549 A1* | 3/2015 | Ram | ........................ | B07C 5/36 |
| | | | | 198/358 |

* cited by examiner

US 10,226,794 B2

DYNAMIC TRAY SPACING

BACKGROUND

1. Technical Field

The present disclosure generally relates sortation conveyors that sort discrete articles to one of multiple destinations, and more specifically controls of the sortation conveyor that prevent overfilling a destination.

2. Description of the Related Art

A distribution center for a set of products is a warehouse or other specialized building that is stocked with products (goods) to be redistributed to retailers, to wholesalers, or directly to consumers. A distribution center is a principal part, the order processing element, of an entire order fulfillment process. A distribution center can also be called a warehouse, a DC, a fulfillment center, a cross-dock facility, a bulk break center, and a package handling center. The name by which the distribution center is known is commonly based on the purpose of the operation. For example, a "retail distribution center" normally distributes goods to retail stores, an "order fulfillment center" commonly distributes goods directly to consumers, and a cross-dock facility stores little or no product but distributes goods to other destinations. Some organizations operate both retail distribution and direct-to-consumer out of a single facility, sharing space, equipment, labor resources, and inventory as applicable.

Distribution centers are the foundation of a supply network, allowing a single location to stock a vast number of products. A large retailer might sell tens of thousands of products from thousands of vendors. Consequently, the retailer would find it impossibly inefficient to ship each product directly from each vendor to each store. Many retailers own and run their own distribution networks, while smaller retailers may outsource this function to dedicated third-party logistics (3pl) firms that coordinate the distribution of products for a number of companies. A distribution center can be co-located at a logistics center.

Sortation conveyors are an important aspect of distribution centers (DCs). Typically goods are received in bulk and need to be immediately or eventually routed to one or more different storage or shipping locations within the DC. The sortation conveyor receives a singulated stream of articles, such as parcels, cartons, totes, shrink wrapped products, bags, etc. The individual articles are identified and a particular divert destination of more than one divert destination is assigned to each article. In many instances, the divert destination is a conveyor, chute, Gaylord or other apparatus that can receive and hold a number of articles that constitute an order for shipping to a specific recipient. The accumulated order can then be moved to a transportation conveyance.

In order to avoid product backing onto the conveying surface of the sortation conveyor, each divert destination can have a sensor such as a photo eye (PE) that indicates a full divert destination. To eliminate or reduce false alarms, a debounce timer is set before declaring a full divert destination to give time for a discharged article to convey past the PE. At the speed of many sortation conveyors such as loop sorters (e.g., tilt tray, cross belt, etc.) or linear sorters, the debounce timer corresponds to a significant space on the sortation conveyor that cannot contain another article destined for the same divert destination. With reference to a particular type of sortation conveyor, the tilt tray loop sorter, this spacing is referred to as tray spacing. A certain number of trays must be between two articles destined for the same divert destination. In other embodiments, determination of what is on the sortation conveyor is made after induction, so articles that cannot be discharged due to tray spacing considerations are reassigned to a later destination or conveyed around back to the originally assigned destination. In the case of a store replenishment order, many articles from the same source can be received by the sortation conveyor in succession that are assigned to the same divert destination. Having to send the inducted articles around the sortation conveyor or skipping locations on the sortation conveyor during induction reduces the throughput and efficiency of an overall material handling system.

BRIEF SUMMARY

In one aspect, the present disclosure provides a method of dynamically adjusting spacing between articles destined for the same divert destination without risking a backup of articles on a sortation conveyor. In one or more embodiments, the method includes monitoring, by a controller, a destination full sensor at a divert destination of a sortation conveyor. The method includes determining whether the destination full sensor indicates a full indication for a sustained period of time that corresponds to a debounce timer set at a length of time sufficient for an unobstructed article that is discharged to the divert destination to traverse past the sensor. In response to receiving a sustained full indication from the destination full sensor, the controller ignores any discharge command to the divert destination for an article inducted onto the sortation conveyor. In response to not receiving a sustained full indication from the destination full sensor, the method includes tracking a predicted fullness state based on a determined size of respective articles discharged to a divert destination to fulfill an order; and determining whether the predicted fullness state is above a first threshold. In response to determining that the predicted fullness state is not above the first threshold, the method includes discharging a trailing article to the assigned destination that is behind a leading article at a first dynamic separation distance that results in insufficient time to satisfy the debounce timer between respective discharges of the trailing and leading articles.

In another aspect, the present disclosure provides a controller having a network interface in communication with a host system and a device interface in communication with a sortation conveyor. A processor subsystem is coupled to the network interface and the device interface. The processor subsystem monitors a destination full sensor at a divert destination of a sortation conveyor. The process subsystem determines whether the destination full sensor indicates a full indication for a sustained period of time that corresponds to a debounce timer set at a length of time sufficient for an unobstructed article that is discharged to the divert destination to traverse past the sensor. In response to receiving a sustained full indication from the destination full sensor, the processor subsystem ignores any discharge command to the divert destination assigned by the host system for an article inducted onto the sortation conveyor. In response to not receiving a sustained full indication from the destination full sensor, the controller (i) tracks a predicted fullness state based on a determined size of respective articles discharged to a divert destination to fulfill an order, and (ii) determines whether the predicted fullness state is above a first threshold. In response to determining that the predicted fullness state is not above the first threshold, the processor subsystem discharges a trailing article to the assigned destination that is behind a leading article at a first dynamic separation distance that results in insufficient time to satisfy the debounce timer between respective discharges of the trailing and leading articles.

In an additional aspect of the present disclosure, a material handling system includes a sortation conveyor; one or more upstream conveyors that accumulate and selectively induct articles onto the sortation conveyor; and one or more divert destinations positioned to reserve articles discharged from the sortation conveyor. A destination full sensor respectively is at each of the one or more divert destinations. The material handling system further includes a controller having network interface in communication with a host system; a device interface in communication with the one or more upstream conveyors, the sortation conveyor; and the destination full sensors; and a processor subsystem coupled to the network interface and the device interface. The processor subsystem monitors the destination full sensor at a divert destination of the sortation conveyor. The processor subsystem determines whether the destination full sensor indicates a full indication for a sustained period of time that corresponds to a debounce timer set at a length of time sufficient for an unobstructed article that is discharged to the divert destination to traverse past the destination full sensor. The processor subsystem, in response to receiving a sustained full indication from the destination full sensor, ignores any discharge command to the divert destination assigned by the host system for an article inducted onto the sortation conveyor. In response to not receiving a sustained full indication from the destination full sensor, the processor subsystem tracks a predicted fullness state based on a determined size of respective articles discharged to a divert destination to fulfill an order; and determines whether the predicted fullness state is above a first threshold. In response to determining that the predicted fullness state is not above the first threshold, the processor subsystem discharging a trailing article to the assigned destination that is behind a leading article at a first dynamic separation distance that results in insufficient time to satisfy the debounce timer between respective discharges of the trailing and leading articles.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
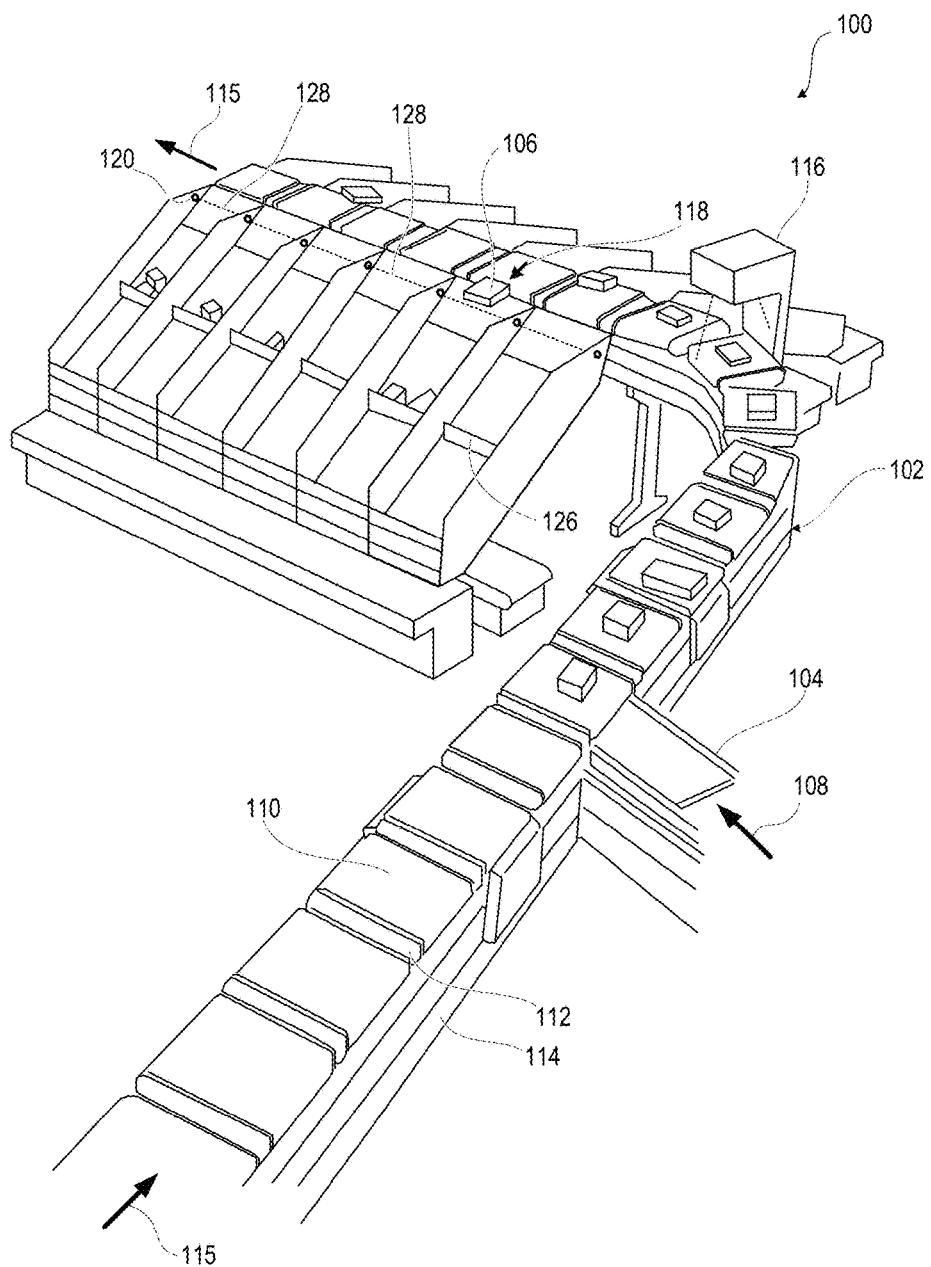
FIG. 1 illustrates a perspective view of a material handling system having a sortation conveyor that performs dynamic tray spacing, according to one or more embodiments.

A controller of a material handling system performs a method of dynamic spacing on a sortation conveyor by predicting fullness of divert destinations. In one or more embodiments, required tray spacing is dynamically enforced subsequent to induction of a stream of articles onto the sortation conveyor. In one or more embodiments, appropriate dynamic spacing is enforced during induction of articles on the sortation conveyor. Spacing between inducted articles destined for the same divert destination are reduced when the divert destination is calculated to have sufficient capacity. Inductions can achieve higher throughput without having to space articles from for the same article sufficiently for a debounce timer to expire of a sensor positioned to detect a full destination.

The operating speed of high throughput TTCB often translates into a "tray spacing" requirement that product intended for the same destination have to be assigned to carriers that are spaced apart by one or more intervening carriers. Although the term "tray" is used, the concept is applicable to cross belt sorters as well.

As a result of the debounce timer and the need to avoid backing up product into the sorter, the number of consecutive products is limited that may be diverted to the same destination. This is referred to as "tray spacing", although the term applies to tilt trays and cross belt sortation conveyors. Tray spacing prevents a second discharge to specific destination within a certain number of trays of previous discharge there. The number of trays is the typically the number of trays that pass within the time window of the debounce timer. The debounce timer is set for at least the time required for product to travel from the tray to and past the PE. As this spacing is done for every item being discharged, tray spacing can have the effect of reducing system throughput.

The present innovation mitigates the reduced system throughput as a result of tray spacing for a typical packing sorter. Net effective tray spacing is dynamically reduced in many if not most instances while still avoiding situations where a destination over-fills and backs product back onto the sorter. Overall system throughput is increased. The effect can be pronounced for uses of a loop sorter such as for store replenishment where a number of like articles can be inducted onto the loop sorter with the intent of going to the same destination.

At the beginning of a packing sorter order, the present innovation recognizes an opportunity to not use tray spacing based on a safe assumption that the chute accumulation area is empty. During initial discharge to a particular order, tracking and summing up the size of the articles discharged to each chute is performed using data obtained from either/both the induction length measuring bridge, the dynamic discharge compensation (DDC) camera or if available, volume data in the order download. All of these can provide good data on the item size. The tracking continues to sum up the volume of product in each chute, and when a specified "fullness threshold" is reached, tray spacing is invoked. An example would be that when the chute is empty and until the chute reaches 80% full, no tray spacing is enforced. From 80% to 90% full, the control system invokes three-fourths (¾) of the generally-known "normal" or nominal tray spacing. After the 90% threshold is reached, nominal tray spacing is invoked as would be required without incorporation of a dynamic tray spacing feature. Tabulation of this data is kept in an upper level control system which communicates the dynamic spacing changes to the machine control system. The machine control system enforces the tray spacing for the specified threshold.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a material handling system 100 that includes a sortation conveyor 102, which in an exemplary embodiment is a cross belt (CB) loop sorter. Aspects of the present innovation can apply to other linear and loop sorters that discharge to multiple destinations that have fixed linear, area or volumetric capacity to accept an order. For example, pusher or shoe linear sorters and tilt tray loop sorters operate at a speed in which the duration of the debounce timer can translate in more than one intervening spaces, belts, trays, etc., when imposing a generally-known fixed "tray" spacing. One or more induction conveyors 104 transfer articles or product 106 on respective locations of the sortation conveyor 102, such as inbound direction indicated by arrow 108. The articles 106 are deposited in this instance on a particular cross belt carriage 110 on a moving carrier 112 that endlessly conveys on a conveyor bed 114 in a looping direction indicated by arrows 115. Confirmation of identity and position on a particular cross belt carriage 110 is performed by a scanner 116 that can capabilities such as optical character recognition (OCR), linear or two-dimensional barcode reading, dimensioning, multiple article detection, etc. Based on confirming what is being conveyed and in response to the particular article 106 being assigned to a particular destination 118, the sortation system discharges the article 106 into an order holding apparatus at the destination 118. In the exemplary embodiment, the order holding apparatus is a chute 120 having an upper compartment 122 and a lower compartment 124 separated by an actuated flipper door 126. A manual or automated process can take away completed orders from the chute 120.

For many chute designs on tilt tray/cross belt (TTCB) sorters, a control system limits the number of consecutive products or articles 106 that may be diverted to the same destination 118. This limitation can: (i) prevent products jamming together; (ii) allow time for an upper/lower level flipper door 126 to move to the appropriate position; or (iii) provide adequate time for a chute full detection system to react a full state. Sending too much product to a full chute can back product onto the moving sorter, leading to jams and damage to the sorter and product. The chute full detection system typically monitors a photo-electric eye (PE) 128. The control system is not set to react instantaneously to the PE 128 because the controller should allow the largest sortable product to pass without triggering a false full state. A "debounce" timer in the control system such that the PE 128 must remain in a blocked condition for a certain period of time before triggering a "chute full" event. When there is a chute full event, sortation to that chute 120 is suspended until the condition is resolved.

Figure 2:
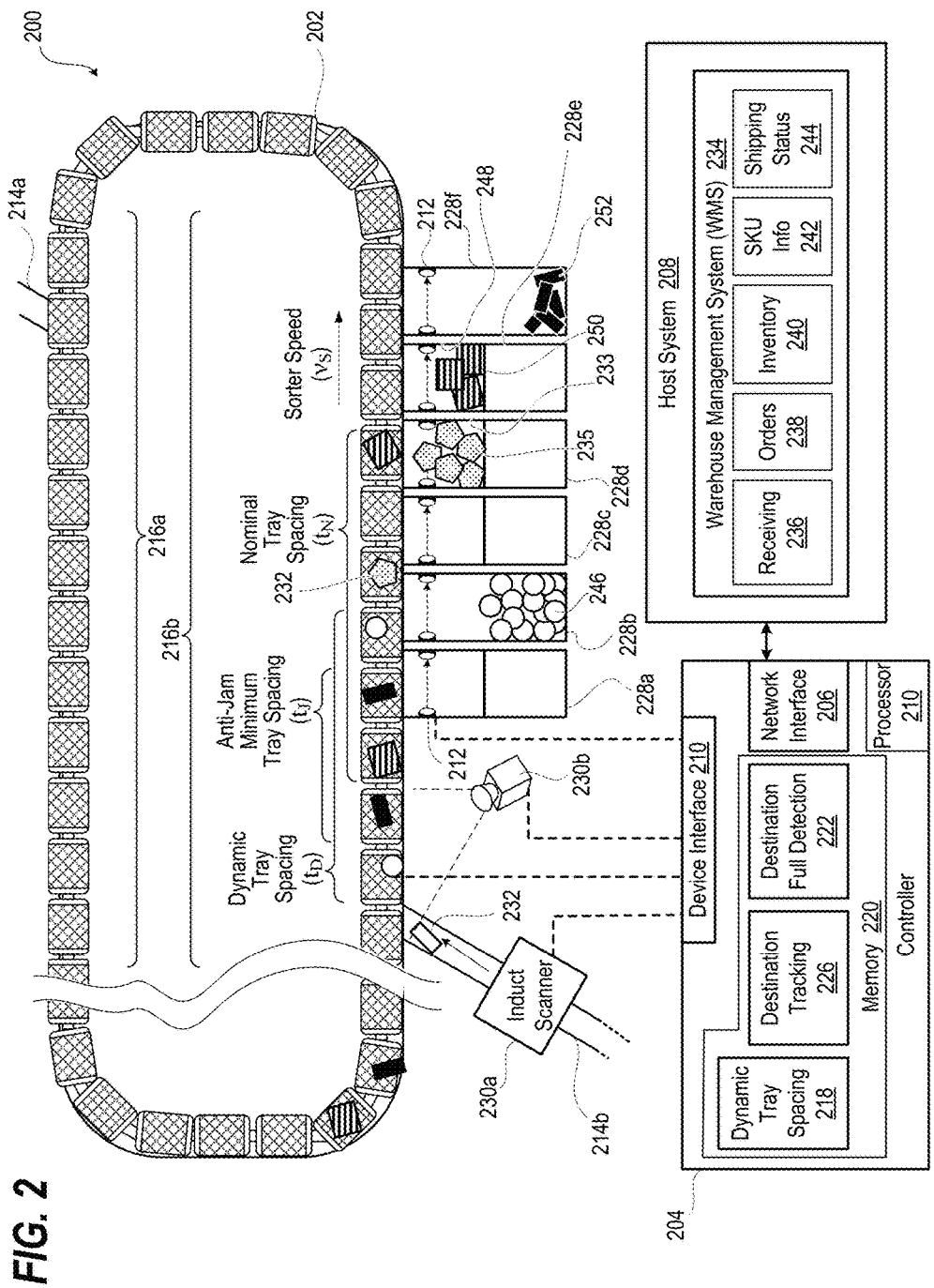
FIG. 2 illustrates a diagram of a material handling system having a sortation conveyor controlled by a controller, according to one or more embodiments.

FIG. 2 illustrates a material handling system 200 that includes a sortation conveyor 202 that is under control of a control system ("controller") 200. The controller 204 includes: (i) a network interface 206 in communication with a host system 208; (ii) a device interface 210 in communication with the sortation conveyor 202; and a processor subsystem 212. The processor subsystem 212 is coupled to the network interface 206 and the device interface 210. In one or more embodiments, sortation conveyor 202 includes top and bottom induction conveyors 214a, 214b to operate as top and bottom virtual sorters 216a, 216b. The controller 204 performs a dynamic tray spacing application 218 that is contained in memory 220. The dynamic tray spacing application 218 augments a destination full detection system 222 that is triggered by destination full sensors 224, such as photo eyes (PEs). In order to augment the destination full detection system 222, the dynamic tray spacing application 218 maintains a destination tracking data structure 226 from which predictions of a degree of fullness of each destination 228a-228f can be made.

The controller 204 is responsive to scanners 230a, 230b that can identify a particular type of article 232 based on tracked location, pattern recognition, recognized indicia, or dimensional data. The host system 208 can provide additional dimensional information, such as via a Warehouse Management System (WMS) 234 that has data structures that track: (i) receiving 236; (ii) orders 238; (iii) inventory 240; (iv) stock-keeping units (SKU) information 242; and (v) shipping status 244.

The processor subsystem 212 of the controller 204 monitors a destination full sensor 224 at each divert destination 228a-228f of the sortation conveyor 202. The processor subsystem 212 determines whether the destination full sensor 224 indicates a full indication for a sustained period of time. The sustained period of time corresponds to a debounce timer set at a length of time sufficient for an unobstructed article that is discharged to the divert destination 228a-228f to traverse past the destination full sensor 224. In response to receiving a sustained full indication from the destination full sensor 224, the processor subsystem 212 ignores any discharge command to the divert destination 228a-228f assigned by the host system 208 for an article 232 inducted onto the sortation conveyor 202. An upper compartment 233 of divert destination 228d contains an order 235 that has triggered the destination full sensor 224 for more than the debounce timer.

In response to not receiving a sustained full indication from the destination full sensor 224, the processor subsystem 212 performs dynamic tray spacing to increase throughput of the material handling system 200 by tracking a predicted fullness state based on a determined size of respective articles 232 discharged to a respective divert destination 228a-228f to fulfill an order. The processor subsystem 212 determines whether the predicted fullness state is above a first threshold. In response to determining that the predicted fullness state is not above the first threshold, the processor subsystem 212 inducts a trailing article behind a leading article that are both destined for the divert location 228a-228f at a first dynamic separation distance that results in insufficient time to satisfy the debounce timer between respective discharges of the trailing and leading articles 232. For example, a dynamic tray spacing $T_D$ can be imposed on articles 232 that are destined for divert destination 228b that contains an order 246 that has plenty of remaining room. In the illustrative example, dynamic tray spacing $T_D$ corresponds to three intervening locations.

In response to determining that the predicted fullness state is above the first threshold, the processor subsystem 212 inducts the trailing article 232 behind the leading article 232 that are both destined for the same divert location 228a-228f at a nominal separation distance that results in satisfying the debounce timer between respective discharges of the trailing and leading articles 232. For example, an upper compartment 248 of divert destination 228e can be predicted to be almost full by order 250 but not yet triggering the destination full sensor 224. Thus, articles 232 destined for divert destination 228e are spaced a nominal tray spacing $T_D$, illustrated as four intervening locations.

In an exemplary embodiment, the processor subsystem 212 determines whether the predicted fullness state is above a second threshold that is less than the first threshold. In response to determining that the predicted fullness state is not above the second threshold and is below the first threshold, the processor subsystem 212 causes the sortation conveyor 202 to induct a trailing article 232 behind a leading article 232 that are both destined for the same divert location 228a-228f at a second dynamic separation distance that is less than the first dynamic separation distance and that satisfies a minimum gap supported by the sortation conveyor, illustrated as an anti-jam minimum spacing $T_J$ corresponding to one intervening location. The assigned divert destination 228f has a very small length, area or volume that is already filled by order 252.

In one or more embodiments, the processor subsystem 212 does not have control over what articles 232 are inducted onto the sortation conveyor 202. Dynamic tray spacing application 218 enforces the required amount of tray spacing dynamically by ignoring discharge commands for trailing articles 232 when the predicted fullness is above the first threshold.

Figure 3:
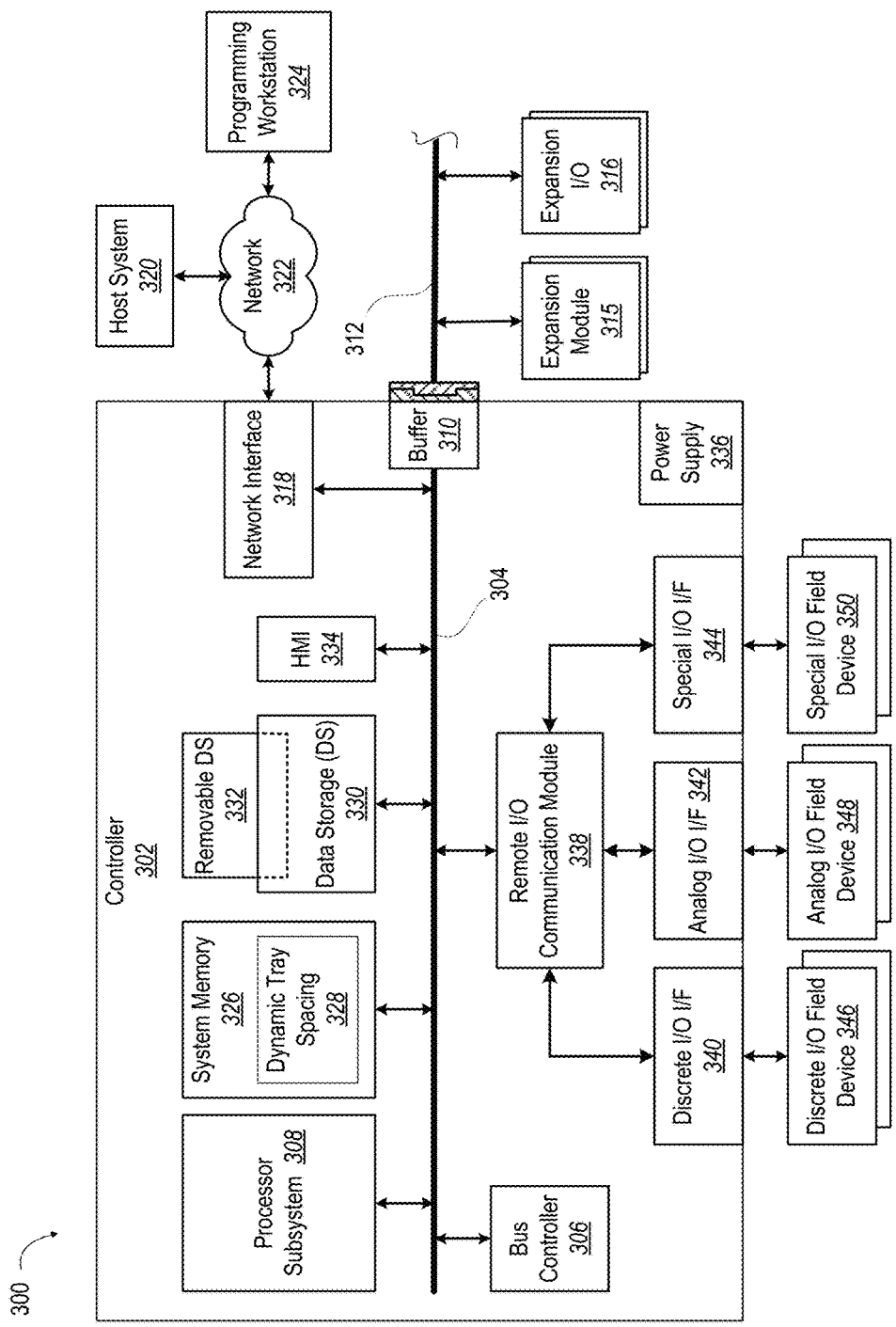
FIG. 3 illustrates an exemplary computing environment for a controller of the material handling system of FIG. 2.

FIG. 3 illustrates a material handling control system 300 that provides an exemplary environment within which one or more of the described features of the various embodiments of the disclosure can be implemented. A controller 302 can be implemented as a unitary device or distributed processing system. The controller 302 includes functional components that communicate across a system interconnect of one or more conductors or fiber optic fabric that for clarity is depicted as a system bus 304. System bus 304 may include a data bus, address bus, and control bus for communicating data, addresses and control information between any of these coupled units. A bus controller 306 can provide infrastructure management of the system bus 304. Processor subsystem 308 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes including control of automation equipment of a material handling system. The controller 302 may be scalable, such as having a buffer 310 on the system bus 304 that communicatively couples with an expansion bus 312 for communicating and interfacing to expansion modules 315 and expansion input/output (I/O) 316.

In accordance with various aspects of the disclosure, an element, or any portion of an element, or any combination of elements may be implemented with processor subsystem 308 that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result.

Controller 302 may include a network interface device (NID) 318 that enables controller 302 to communicate or interface with other devices, services, and components that are located external to controller 302, such as a host system 320. Host system 320 can provide scheduling information to the controller 302 such as identification of items being directed to a controlled component and their assigned destination. Host system 320 can provide programming for the controller 302 and obtain diagnostic and status monitoring data. These networked devices, services, and components can interface with controller 302 via an external network, such as example network 322, using one or more communication protocols. Network 322 can be a local area network, wide area network, personal area network, and the like, and the connection to and/or between network and controller 302 can be wired or wireless or a combination thereof. For purposes of discussion, network 322 is indicated as a single collective component for simplicity. However, it is appreciated that network 322 can comprise one or more direct connections to other devices as well as a more complex set of interconnections as can exist within a wide area network, such as the Internet or on a private intranet. For example, a programming workstation 324 can remotely modify programming or parameter settings of controller 302 over the network 322. Various links in the network 322 can wired or wireless.

System memory 326 can be used by processor subsystem 308 for holding functional components such as data and software such as a dynamic tray spacing application 328 that is retrieved from data storage 330. Data and software can be provided to the controller 302 or exported from the controller 302 via removable data storage (RDS) 332. Software may be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, function block diagram (FBD), ladder diagram (LD), structured text (ST), instruction list (IL), and sequential function chart (SFC) or otherwise. The software may reside on a computer-readable medium.

For clarity, system memory 326 is random access memory, which may or may not be volatile, and data storage 330 is generally nonvolatile. System memory 326 and data storage 330 contain one or more types of computer-readable medium, which can be a non-transitory or transitory. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Certain manual interactions and indications can also be provided via a human-machine interface (HMI) 334 that is integral or connected to the controller 302. HMI can be formed of one or more devices that provides input and output functions such as via a touch screen graphical display, keypad, microphone, speaker, haptic device, camera, gauges, light indicators, dials, switches, etc. A power supply 336 provides regulated voltages at required levels for the various components of the controller 302 and can draw upon facility power.

A remote I/O communication module 338 can provide communication protocol for handling of various inputs and outputs between the system bus 304 and controller interfaces such as a discrete I/O interface/s 340, analog I/O interface/s 342, and special I/O interface/s 344. Each interface 340, 342, 344 can provide as necessary analog-to-digital or digital-to-analog conversion, signal processing, buffering, encoding, decoding, etc., in order to communicate with discrete, analog, or special/O field devices 346, 348, 350, respectively.

Figure 4:
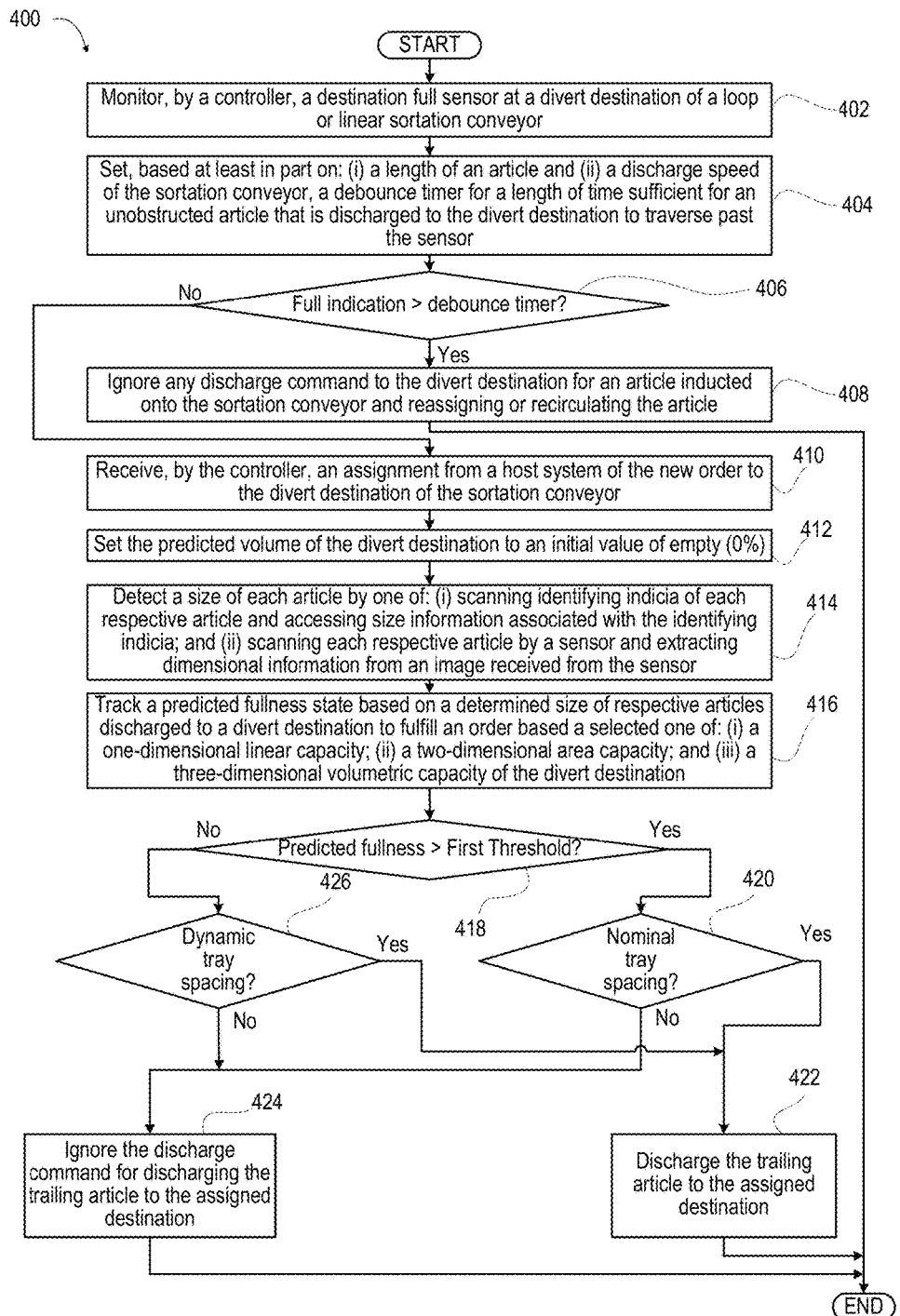
FIG. 4 illustrates a flow diagram of a method of performing dynamic tray spacing for increased throughput by a material handling system, according to one or more embodiments.

FIG. 4 illustrates a method 400 for performing dynamic tray spacing of a sortation conveyor to increase throughput. In one or more embodiments, method 400 begins monitoring, by a controller, a destination full sensor at a divert destination of a loop or linear sortation conveyor (block 402). Method 400 includes setting, based at least in part on: (i) a length of an article and (ii) a discharge speed of the sortation conveyor, a debounce timer for a length of time sufficient for an unobstructed article that is discharged to the divert destination to traverse past the sensor (block 404). Method 400 includes determining whether the destination full sensor indicates a full indication for a sustained period of time based on an expired debounce timer (decision block 406). In response to receiving a sustained full indication from the destination full sensor, method 400 includes ignoring any discharge command to the divert destination for an article inducted onto the sortation conveyor and reassigning or recirculating the article (block 408). Then method 400 ends.

In response to not receiving a sustained full indication from the destination full sensor in decision block 406, method 400 includes receiving, by the controller, an assignment from a host system of the new order to the divert destination of the sortation conveyor (block 410). Controller sets the predicted volume of the divert destination to an initial value of empty (0%) (block 412). Method 400 includes detecting a size of each article by one of: (i) scanning identifying indicia of each respective article and accessing size information associated with the identifying indicia; and (ii) scanning each respective article by a sensor and extracting dimensional information from an image received from the sensor (block 414). Method 400 includes tracking a predicted fullness state based on a determined size of respective articles discharged to a divert destination to fulfill an order based a selected one of: (i) a one-dimensional linear capacity; (ii) a two-dimensional area capacity; and (iii) a three-dimensional volumetric capacity of the divert destination (block 416). The controller determines whether the predicted fullness state is above a first threshold (decision block 418). In response to determining that the predicted fullness state is above the first threshold in decision block 418, the controller further determines whether the separation between the leading and trailing article satisfies the nominal tray spacing value (decision block 420). In particular, the nominal tray spacing value is a separation distance that results in sufficient time to satisfy the debounce timer between respective discharges of the trailing and leading articles. In response to determining that the nominal tray spacing value is satisfied, the method 400 includes discharging the trailing article to the assigned destination (block 422). Then method 400 ends. In response to determining that the nominal tray spacing value is not satisfied, method 400 includes ignoring, by the controller, any discharge command to the divert destination for an article inducted onto the sortation conveyor and reassigning or recirculating the article (block 424). Then method 400 ends.

In response to determining that the predicted fullness state is not above the first threshold in decision block 418, the controller further determines whether the separation between the leading and trailing article satisfies the dynamic tray spacing value, which is less than the nominal tray spacing value (decision block 426). In particular, the dynamic tray spacing value is a first dynamic separation distance that results in insufficient time to satisfy the debounce timer between respective discharges of the trailing and leading articles. In response to determining that the dynamic tray spacing value is satisfied, the method 400 returns to block 422 to discharge the trailing article to the assigned destination. In response to determining that the dynamic tray spacing value is satisfied, the method 400 returns to block 424 to ignore the discharge command. Then method 400 ends.

In response to determining that the destination full sensor is not blocked, the controller discharges the trailing article to the assigned destination (block 422). Then method 400 ends. In response to determining that the destination full sensor is blocked, the controller ignores the discharge command for discharging the trailing article to the assigned destination (block 424). Then method 400 ends. In response to determining that the predicted fullness state is not above the first threshold in decision block 418, the controller discharges the trailing article at the assigned destination without regard to a blocked status of the destination full sensor (block 426). Then method 400 ends.

Figure 5:
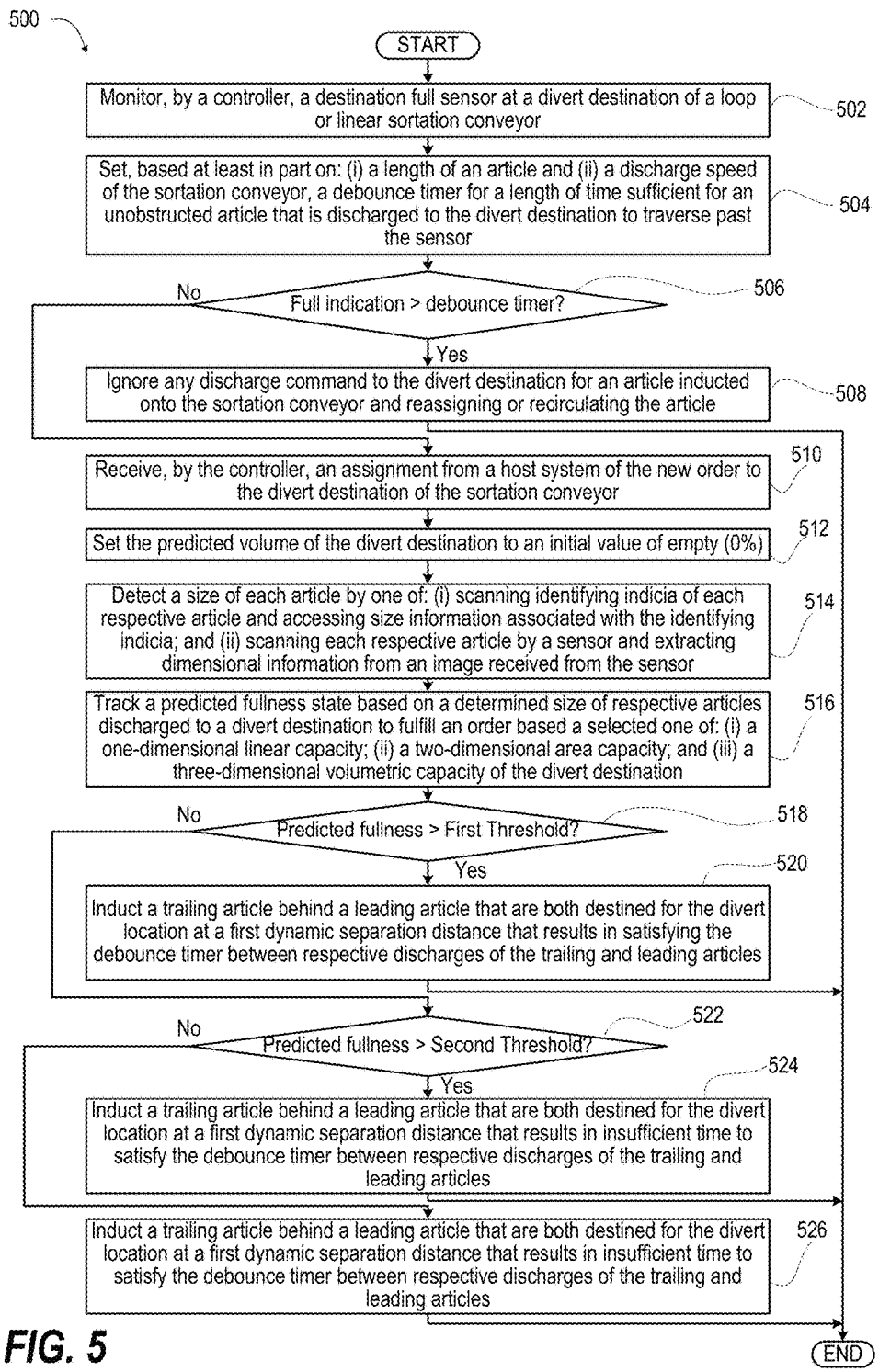
FIG. 5 illustrates an exemplary flow diagram of a method of performing dynamic tray spacing for increased throughput by a material handling system, according to one or more embodiments.

FIG. 5 illustrates a method 500 for performing dynamic tray spacing of a sortation conveyor to increase throughput. In one or more embodiments, method 500 includes monitoring, by a controller, a destination full sensor at a divert destination of a loop or linear sortation conveyor (block 502). Method 500 includes setting, based at least in part on: (i) a length of an article and (ii) a discharge speed of the sortation conveyor, a debounce timer for a length of time sufficient for an unobstructed article that is discharged to the divert destination to traverse past the sensor (block 504). Method 500 includes determining whether the destination full sensor indicates a full indication for a sustained period of time based on an expired debounce timer (decision block 506). In response to receiving a sustained full indication from the destination full sensor, method 500 includes ignoring any discharge command to the divert destination for an article inducted onto the sortation conveyor and reassigning or recirculating the article (block 508). Then method 500 ends.

In response to not receiving a sustained full indication from the destination full sensor in decision block 506, method 500 includes receiving, by the controller, an assignment from a host system of the new order to the divert destination of the sortation conveyor (block 510). Controller sets the predicted volume of the divert destination to an initial value of empty (0%) (block 512). Method 500 includes detecting a size of each article by one of: (i) scanning identifying indicia of each respective article and accessing size information associated with the identifying indicia; and (ii) scanning each respective article by a sensor and extracting dimensional information from an image received from the sensor (block 514). Method 500 includes tracking a predicted fullness state based on a determined size of respective articles discharged to a divert destination to fulfill an order based a selected one of: (i) a one-dimensional linear capacity; (ii) a two-dimensional area capacity; and (iii) a three-dimensional volumetric capacity of the divert destination (block 516). The controller determines whether the predicted fullness state is above a first threshold (decision block 518). In response to determining that the predicted fullness state is above the first threshold in decision block 518, the controller inducts the trailing article behind the leading article that are both destined for the divert location at a nominal separation distance that results in satisfying the debounce timer between respective discharges of the trailing and leading articles (block 520). Then method 500 ends.

In response to determining that the predicted fullness state is not above the first threshold, controller determines whether the predicted fullness state is above a second threshold that is less than the first threshold (decision block 522). In response to determining that the predicted fullness state is above the second threshold, method 500 includes inducting a trailing article behind a leading article that are both destined for the divert location at a first dynamic separation distance that results in insufficient time to satisfy the debounce timer between respective discharges of the trailing and leading articles (block 524). In response to determining that the predicted fullness state is not above the second threshold, method 500 includes inducting a trailing article behind a leading article that are both destined for the divert location at a second dynamic separation distance that is less than the first dynamic separation distance and that satisfies a minimum gap supported by the sortation conveyor (block 526). Then method 500 ends.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
monitoring a destination full sensor at a divert destination of a sortation conveyor;
determining whether the destination full sensor indicates a full indication for a sustained period of time that corresponds to a debounce timer set at a length of time sufficient for an unobstructed article that is discharged to the divert destination to traverse past the sensor;
in response to receiving a sustained full indication from the destination full sensor, ignoring any discharge command to the divert destination for an article inducted onto the sortation conveyor;
in response to not receiving a sustained full indication from the destination full sensor:
tracking a predicted fullness state based on a determined size of respective articles discharged to a divert destination to fulfill an order;
determining whether the predicted fullness state is above a first threshold; and
in response to determining that the predicted fullness state is not above the first threshold, discharging a trailing article to the assigned destination that is behind a leading article at a first dynamic separation distance that results in insufficient time to satisfy the debounce timer between respective discharges of the trailing and leading articles.

2. The method of claim 1, further comprising, in response to not receiving a sustained full indication from the destination full sensor and in response to determining that the predicted fullness state is above the first threshold, ignoring a discharge command for the trailing article at divert location unless a nominal separation distance exists that results in satisfying the debounce timer between respective discharges of the trailing and leading articles.

3. The method of claim 1, further comprising:
in response to determining that the predicted fullness state is not above the first threshold, inducting onto the sortation conveyor a trailing article behind a leading article that are both destined for the divert location at a first dynamic separation distance that results in insufficient time to satisfy the debounce timer between respective discharges of the trailing and leading articles; and
in response to determining that the predicted fullness state is above the first threshold, inducting onto the sortation conveyor the trailing article behind the leading article that are both destined for the divert location at a nominal separation distance that results in satisfying the debounce timer between respective discharges of the trailing and leading articles.

4. The method of claim 3 wherein inducting the trailing article behind the leading article comprises interleaving from another conveyor an article destined for another divert destination between the trailing and leading articles.

5. The method of claim 1, wherein tracking the predicted fullness state based on the determined size of the respective articles discharged to the divert destination to fulfill the new order comprises:
scanning identifying indicia of each respective article; and
accessing size information associated with the identifying indicia.

6. The method of claim 1, wherein tracking the predicted fullness state based on the determined size of the respective articles discharged to the divert destination to fulfill the new order comprises:
scanning each respective article by a sensor; and
extracting dimensional information from an image received from the sensor.

7. The method of claim 1, further comprising setting the debounce timer based at least in part on: (i) a length of an article and (ii) a discharge speed of the sortation conveyor.

8. The method of claim 1, wherein tracking the predicted fullness state based on the determined size of respective articles discharged to the divert destination to fulfill the order comprises:
receiving an assignment of the new order to the divert destination of the sortation conveyor; and
setting the predicted volume of the divert destination to an initial value of empty.

9. The method of claim 1, further comprising:
determining whether the predicted fullness state is above a second threshold that is less than the first threshold;
in response to determining that the predicted fullness state is not above the second threshold, inducting a trailing article behind a leading article that are both destined for the divert location at a second dynamic separation distance that is less than the first dynamic separation distance and that satisfies a minimum gap supported by the sortation conveyor.

10. The method of claim 1, wherein tracking the predicted fullness state based on a determined size of respective articles discharged to the divert destination to fulfill the order comprises tracking a selected one of: (i) a one-dimensional linear capacity; (ii) a two-dimensional area capacity; and (iii) a three-dimensional volumetric capacity of the divert destination.

11. A controller comprising:
a network interface in communication with a host system;
a device interface in communication with a sortation conveyor; and
a processor subsystem coupled to the network interface and the device interface and which:
monitors a destination full sensor at a divert destination of a sortation conveyor;
determines whether the destination full sensor indicates a full indication for a sustained period of time that corresponds to a debounce timer set at a length of time sufficient for an unobstructed article that is discharged to the divert destination to traverse past the sensor;
in response to receiving a sustained full indication from the destination full sensor, ignores any discharge command to the divert destination assigned by the host system for an article inducted onto the sortation conveyor;
in response to not receiving a sustained full indication from the destination full sensor;
tracks a predicted fullness state based on a determined size of respective articles discharged to a divert destination to fulfill an order;
determines whether the predicted fullness state is above a first threshold; and
in response to determining that the predicted fullness state is not above the first threshold, discharges a trailing article to the assigned destination that is behind a leading article at a first dynamic separation distance that results in insufficient time to satisfy the debounce timer between respective discharges of the trailing and leading articles.

12. The controller of claim 11, further comprising, in response to not receiving a sustained full indication from the destination full sensor and in response to determining that the predicted fullness state is above the first threshold, the processor subsystem ignores a discharge command from the host system for the trailing article at divert location unless a nominal separation distance exists that results in satisfying the debounce timer between respective discharges of the trailing and leading articles.

13. The controller of claim 11, wherein the processor subsystem:
    in response to determining that the predicted fullness state is not above the first threshold, inducts onto the sortation conveyor a trailing article behind a leading article that are both destined for the divert location at a first dynamic separation distance that results in insufficient time to satisfy the debounce timer between respective discharges of the trailing and leading articles; and
    in response to determining that the predicted fullness state is above the first threshold, inducts onto the sortation conveyor the trailing article behind the leading article that are both destined for the divert location at a nominal separation distance that results in satisfying the debounce timer between respective discharges of the trailing and leading articles.

14. The controller of claim 13 wherein the processor subsystem inducts the trailing article behind the leading article by interleaving from another conveyor an article destined for another divert destination between the trailing and leading articles.

15. The controller of claim 11, wherein the processor subsystem tracks the predicted fullness state based on the determined size of the respective articles discharged to the divert destination to fulfill the new order by:
    receiving a scan by a sensor of identifying indicia of each respective article; and
    accessing size information associated with the identifying indicia.

16. The controller of claim 11, wherein the processor subsystem tracks the predicted fullness state based on the determined size of the respective articles discharged to the divert destination to fulfill the new order by:
    receiving a scan by a sensor of each respective article by a sensor; and
    extracting dimensional information from an image received from the sensor.

17. The controller of claim 11, wherein the processor subsystem sets the debounce timer based at least in part on: (i) a length of an article and (ii) a discharge speed of the sortation conveyor.

18. The controller of claim 11, wherein the processor subsystem tracks the predicted fullness state based on the determined size of respective articles discharged to the divert destination to fulfill the order by:
    receiving an assignment of the new order to the divert destination of the sortation conveyor; and
    setting the predicted volume of the divert destination to an initial value of empty.

19. The controller of claim 11, wherein the processor subsystem:
    determines whether the predicted fullness state is above a second threshold that is less than the first threshold;
    in response to determining that the predicted fullness state is not above the second threshold, inducts a trailing article behind a leading article that are both destined for the divert location at a second dynamic separation distance that is less than the first dynamic separation distance and that satisfies a minimum gap supported by the sortation conveyor.

20. The controller of claim 11, wherein the controller tracks the predicted fullness state based on a determined size of respective articles discharged to the divert destination to fulfill the order comprises tracking a selected one of: (i) a one-dimensional linear capacity; (ii) a two-dimensional area capacity; and (iii) a three-dimensional volumetric capacity of the divert destination.

21. A material handling system comprising:
    a sortation conveyor;
    one or more upstream conveyors that accumulate and selectively induct articles onto the sortation conveyor;
    one or more divert destinations positioned to reserve articles discharged from the sortation conveyor;
    a destination full sensor respectively at each of the one or more divert destinations;
    a controller comprising: (i) a network interface in communication with a host system; (ii) a device interface in communication with the one or more upstream conveyors, the sortation conveyor; and the destination full sensors; and (iii) a processor subsystem coupled to the network interface and the device interface and which:
        monitors the destination full sensor at a divert destination of the sortation conveyor;
        determines whether the destination full sensor indicates a full indication for a sustained period of time that corresponds to a debounce timer set at a length of time sufficient for an unobstructed article that is discharged to the divert destination to traverse past the destination full sensor;
        in response to receiving a sustained full indication from the destination full sensor, ignores any discharge command to the divert destination assigned by the host system for an article inducted onto the sortation conveyor;
        in response to not receiving a sustained full indication from the destination full sensor;
        tracks a predicted fullness state based on a determined size of respective articles discharged to a divert destination to fulfill an order;
        determines whether the predicted fullness state is above a first threshold; and
        in response to determining that the predicted fullness state is not above the first threshold, discharges a trailing article to the assigned destination that is behind a leading article at a first dynamic separation distance that results in insufficient time to satisfy the debounce timer between respective discharges of the trailing and leading articles.

22. The material handling system of claim 20, wherein the sortation conveyor comprises a loop sorter.

23. The material handling system of claim 18, wherein the sortation conveyor comprises a linear sorter.

* * * * *